(12) United States Patent
Kulal et al.

(10) Patent No.: US 12,434,228 B1
(45) Date of Patent: Oct. 7, 2025

(54) CATALYST FOR ETHYLBENZENE DEHYDROGENATION TO FORM STYRENE

(71) Applicant: KING FAHD UNIVERSITY OF PETROLEUM AND MINERALS, Dhahran (SA)

(72) Inventors: Nagendra Kulal, Dhahran (SA); Bassam Elali, Dhahran (SA); Ganapati Shanbhag, Bengaluru (IN); Ziyauddin Qureshi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/238,128

(22) Filed: Jun. 13, 2025

(51) Int. Cl.
| | |
|---|---|
| *B01J 23/83* | (2006.01) |
| *B01J 21/04* | (2006.01) |
| *B01J 23/745* | (2006.01) |
| *B01J 35/30* | (2024.01) |
| *B01J 35/70* | (2024.01) |
| *B01J 37/03* | (2006.01) |
| *B01J 37/04* | (2006.01) |
| *B01J 37/06* | (2006.01) |
| *B01J 37/08* | (2006.01) |
| *C07C 5/42* | (2006.01) |

(52) U.S. Cl.
CPC .............. *B01J 23/83* (2013.01); *B01J 21/04* (2013.01); *B01J 23/745* (2013.01); *B01J 35/394* (2024.01); *B01J 35/733* (2024.01); *B01J 37/035* (2013.01); *B01J 37/04* (2013.01); *B01J 37/06* (2013.01); *B01J 37/088* (2013.01); *C07C 5/42* (2013.01)

(58) Field of Classification Search
CPC . B01J 21/04; B01J 23/745; B01J 23/83; B01J 35/394; B01J 35/733; B01J 37/035; B01J 37/04; B01J 37/06; B01J 37/088; C07C 5/42
See application file for complete search history.

(56) References Cited

U.S. PATENT DOCUMENTS

2017/0267608 A1    9/2017  Wang et al.

FOREIGN PATENT DOCUMENTS

| CN | 106582687 A | 4/2017 |
|---|---|---|
| CN | 109999810 A | 7/2019 |
| KR | 10-2021-0081850 A | 7/2021 |

OTHER PUBLICATIONS

Li, L. et al, 2023, Journal of Physics and Chemistry of Solids, 177, 111285. <https://doi.org/10.1016/j.jpcs.2023.111285> (Year: 2023).*

(Continued)

*Primary Examiner* — Brian A Mccaig
(74) *Attorney, Agent, or Firm* — Oblon, McClelland, Maier &Neustadt, L.L.P.

(57) ABSTRACT

A catalyst includes an alumina support, $GdFeO_3$ distributed on the alumina support, and $Fe_2O_3$ distributed on the alumina support. The $GdFeO_3$ is in the form of an orthorhombic perovskite structure with a Pbnm space group, and the $Fe_2O_3$ is in the form of $\gamma\text{-}Fe_2O_3$. Further, the catalyst includes 1 percent by weight (wt. %) to 7 wt. % of Gd and 5 wt. % to 15 wt. % of Fe based on a total weight of the catalyst.

20 Claims, 4 Drawing Sheets

(56) References Cited

OTHER PUBLICATIONS

Balamurugan C, et al., "GdFeO3 perovskite oxide decorated by group X heterometal oxides and bifunctional oxygen electrocatalysis", Molecules, vol. 13, Issue 2, Jan. 7, 2021, 8 Pages.

Y. Joseph, et al., "Interaction of ethylbenzene and styrene with iron oxide model catalyst films at low coverages: A Nexafs study", Physical Chemistry Chemical Physics, 2 (2000) 5314-5319, 6 Pages.

G.R. Meima, "Catalyst deactivation phenomena in styrene production", Applied Catalysis A: General, 212 (2001) 239-245, 7 pages.

M. Muhler, et al., "The Nature of the Iron Oxide-Based Catalyst for Dehydrogenation of Ethylbenzene to Styrene", 2. Surface chemistry of the active phase, Journal of Catalysis, 138 (1992) 413-444, 32 Pages.

Y. Subramanian, et al., "Investigations on the enhanced dye degradation activity of heterogeneous BiFeO3—GdFeO3 nanocomposite photocatalyst", Heliyon 5, 2019, journal homepage: www.heliyon.com. 1-10, 10 Pages.

I. Rossetti, et al., "Study of the deactivation of a commercial catalyst for ethylbenzene dehydrogenation to styrene", Applied Catalysis A: General, 292 (2005) 118-123, 6 Pages.

\* cited by examiner

CATALYST FOR ETHYLBENZENE DEHYDROGENATION TO FORM STYRENE

BACKGROUND

Technical Field

The present disclosure relates to catalytic materials for hydrocarbon conversion processes. More particularly, the present disclosure pertains to catalysts including gadolinium ferrite ($GdFeO_3$) and iron oxide ($Fe_2O_3$) distributed on an alumina support for use in e.g. the dehydrogenation of ethylbenzene to styrene under high-temperature conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Worldwide, styrene is considered as an essential chemical feedstock used primarily as a monomer for the production of polymers. Global demand for styrene reached approximately 30 million tons in 2021 and is projected to continue rising. Industrially, styrene is primarily synthesized by the dehydrogenation of ethylbenzene over iron oxide-based catalysts at temperatures ranging from 873 K to 973 K [I. Rossetti, E. Bencini, L. Trentini, L. Forni, *Study of the deactivation of a commercial catalyst for ethylbenzene dehydrogenation to styrene, Applied Catalysis A: General*, 292 (2005) 118-123, incorporated herein by reference in its entirety]. The dehydrogenation of ethylbenzene to styrene (DES) is a highly endothermic reaction, and steam is co-fed with the reactants to maintain the oxidation state of the iron catalyst, thereby mitigating catalyst deactivation via coke formation.

Iron-based catalysts are traditionally known for catalytic processes such as the Haber-Bosch process, the water-gas shift (WGS) reaction, and Fischer-Tropsch (FT) synthesis. In addition, iron catalysts are commercially employed in the synthesis of styrene from ethylbenzene [J. Matsui, T. Sodesawa, F. Nozaki, *Influence of carbon dioxide addition upon decay of activity of a potassium-promoted iron oxide catalyst for dehydrogenation of ethylbenzene, Applied catalysis*, 67 (1990) 179-188]. Within the iron oxide family, ferric oxide ($Fe_2O_3$) and magnetite ($Fe_3O_4$) are reported as the principal phases active for the DES reaction [Y. Joseph, M. Wühn, A. Niklewski, W. Ranke, W. Weiss, C. Wöll, R. Schlögl, *Interaction of ethylbenzene and styrene with iron oxide model catalyst films at low coverages: A NEXAFS study, Physical Chemistry Chemical Physics*, 2 (2000) 5314-5319, incorporated herein by reference in its entirety]. Among these, $Fe_2O_3$ is preferred due to its stronger Lewis acidity and absence of $Fe^{2+}$ ions, which reduces strong binding interactions with ethylbenzene and styrene, reducing catalyst deactivation according to the hard and soft acids and bases (HSAB) principle. Conversely, $Fe_3O_4$ interacts more strongly with the soft basic character of ethylbenzene and styrene, leading to rapid deactivation [Y. Joseph, M. Wühn, A. Niklewski, W. Ranke, W. Weiss, C. Wöll, R. Schlögl, *Interaction of ethylbenzene and styrene with iron oxide model catalyst films at low coverages: A NEXAFS study, Physical Chemistry Chemical Physics*, 2 (2000) 5314-5319, incorporated herein by reference in its entirety].

At elevated temperatures necessary for DES, iron may undergo reduction and transformation into iron carbide, resulting in the loss of catalytic activity [G. R. Meima, P. G. Menon, *Catalyst deactivation phenomena in styrene production, Applied Catalysis A: General*, 212 (2001) 239-245, incorporated herein by reference in its entirety]. In commercial applications, potassium (K) has been used as a promoter to limit deactivation, with the active $KFeO_2$ phase enhancing DES performance [T. Hirano, *Roles of potassium in potassium-promoted iron oxide catalyst for dehydrogenation of ethylbenzene, Applied catalysis*, 26 (1986) 65-79 and M. Muhler, J. Schütze, M. Wesemann, T. Rayment, A. Dent, R. Schlögl, G. Ertl, *The nature of the iron oxide-based catalyst for dehydrogenation of ethylbenzene to styrene: I. Solid-state chemistry and bulk characterization, Journal of Catalysis*, 126 (1990) 339-360]. Additionally, other promoters including $V_2O_5$, $CeO_2$, $MoO_3$, $Cr_2O_3$, and alkaline earth oxides have been explored for modifying iron-based catalysts.

However, the highly endothermic nature of DES requires substantial energy input, and at temperatures exceeding 500° C., styrene tends to polymerize into polystyrene, further promoting coke deposition on the catalyst [L. Zhang, Z. Wu, N. C. Nelson, A. D. Sadow, I. I. Slowing, S. H. Overbury, *Role of CO2 as a soft oxidant for dehydrogenation of ethylbenzene to styrene over a high-surface-area ceria catalyst, ACS Catalysis*, 5 (2015) 6426-6435]. In order to address the above-listed issues, commercial processes employ steam to moderate temperature effects and reduce coke formation. Recent research has focused on alternative oxidants such as $CO_2$, $N_2O$, $O_2$, and $SO_2$ to enable lower-temperature operation [J. Xu, B. Xue, Y.-M. Liu, Y.-X. Li, Y. Cao, K.-N. Fan, *Mesostructured Ni-doped ceria as an efficient catalyst for styrene synthesis by oxidative dehydrogenation of ethylbenzene, Applied Catalysis A: General*, 405 (2011) 142-148, N. Shiju, M. Anilkumar, S. Mirajkar, C. Gopinath, B. Rao, C. Satyanarayana, *Oxidative dehydrogenation of ethylbenzene over vanadia-alumina catalysts in the presence of nitrous oxide: structure-activity relationship, Journal of Catalysis*, 230 (2005) 484-492 and C. Adams, T. Jennings, *Catalytic oxidations with sulfur dioxide: II. Alkylaromatics, Journal of Catalysis*, 17 (1970) 157-177.]. Among these, $CO_2$ is considered particularly advantageous due to its ability to decrease reactant partial pressures, eliminate the need for latent heat of vaporization, and provide high heat capacity [S. Chen, Z. Qin, X. Xu, J. Wang, *Structure and properties of the alumina-supported vanadia catalysts for ethylbenzene dehydrogenation in the presence of carbon dioxide, Applied Catalysis A: General*, 302 (2006) 185-192]. However, the use of $CO_2$ introduces complexities associated with competing reactions. Iron catalysts promote the reverse water-gas shift reaction between $CO_2$ and $H_2$, producing CO and $H_2O$, and the produced CO can undergo Fischer-Tropsch-type reactions on iron active sites, potentially inhibiting ethylbenzene conversion [M. Muhler, R. Schlögl, G. Ertl, *The nature of the iron oxide-based catalyst for dehydrogenation of ethylbenzene to styrene 2. Surface chemistry of the active phase, Journal of Catalysis*, 138 (1992) 413-444, incorporated herein by reference in its entirety]. Although catalysts such as $CeO_2$, $Sr_{0.8}Ba_{0.2}Fe_{0.2}Mn_{0.8}O_3-\delta$, and $Fe_2O_3/Al_2O_3$ have been reported for DES with $CO_2$ as an oxidant, improvements in catalyst stability and selectivity remain necessary [R. Wang, J. Zhang, D. Li, K. Li, H. Wang, X. Zhu, *Lattice Oxygen Regulation of Perovskites for Chemical Looping Oxidative Dehydrogenation of Ethylbenzene to Styrene, ACS Sustainable Chemistry & Engineering*, (2023) and N. Mimura, M. Saito, *Dehydrogenation of eth-*

*ylbenzene to styrene over Fe2O3/Al2O3 catalysts in the presence of carbon dioxide, Catalysis letters,* 58 (1999) 59-62.].

Perovskite materials have emerged as desirable candidates for various catalytic applications due to their high thermal stability, tunable compositions, flexible structural frameworks, and robust redox properties. While perovskites have been extensively studied as electrocatalysts and photocatalysts for energy conversion, their application as thermal catalysts for hydrocarbon dehydrogenation processes remains comparatively underexplored.

Each of the aforementioned references suffers from one or more drawbacks hindering their adoption. Accordingly, one object of the present disclosure is to provide a catalyst composition, that may circumvent the above-listed drawbacks and limitations of the methods known in the art.

SUMMARY

In an exemplary embodiment, a catalyst is disclosed. The catalyst includes an alumina support, $GdFeO_3$ distributed on the alumina support, and $Fe_2O_3$ distributed on the alumina support. The $GdFeO_3$ is in the form of an orthorhombic perovskite structure with a Pbnm space group, and the $Fe_2O_3$ is in the form of $\gamma$-$Fe_2O_3$. Further, the catalyst includes 1 percent by weight (wt. %) to 7 wt. % of Gd and 5 wt. % to 15 wt. % of Fe based on a total weight of the catalyst.

In some embodiments, the catalyst is obtained by adding $NH^{4+}$ to a mixture containing $H_2O$, $Al_2O_3$, $Gd^{3+}$ and $Fe^{3+}$ to obtain a precipitate, washing the precipitate so that a pH of the precipitate is 6-8, and calcinating the precipitate to obtain the catalyst at 600-1000° C. for 1-24 hours.

In some embodiments, the mixture is obtained by dissolving 0.57 g of $Gd(NO_3)_3 \cdot 6H_2O$ and 6.62 g of $Fe(NO_3)_3 \cdot 9H_2O$ in 50 mL of water to form a solution, and adding 5 g of gamma $Al_2O_3$ to the solution to form the mixture.

In some embodiments, the precipitate is washed so that the pH of the precipitate is 7, and the precipitate is calcinated at 800° C. for 6 hours under static air.

In some embodiments, the adding the $NH^{4+}$ is accomplished by adding drop by drop an aqueous solution of 28 wt. % of $NH_4OH$ based on a total weight of the aqueous solution.

In some embodiments, gadolinium element of the catalyst exists in a single form of the $GdFeO_3$, and the catalyst includes no $Gd_2O_3$.

In some embodiments, the catalyst includes 4 wt. % of Gd and 10 wt. % of Fe based on the total weight of the catalyst.

In some embodiments, $Fe^{3+}$ of the catalyst is more stable than $Fe^{3+}$ of a comparative catalyst, which is the same as the catalyst except without gadolinium element, at a temperature range of 400° C. to 900° C.

In some embodiments, the first $Fe^{3+}$ reduction temperature of $Fe_2O_3$ to $Fe_3O_4$ of the catalyst is at least 20° C. higher than a $Fe^{3+}$ reduction temperature of $Fe_2O_3$ to $Fe_3O_4$ of the comparative catalyst.

In some embodiments, the first $Fe^{3+}$ reduction temperature of $Fe_2O_3$ to $Fe_3O_4$ of the catalyst is a minor $Fe^{3+}$ reduction for the catalyst, and the $Fe^{3+}$ reduction temperature of $Fe_2O_3$ to $Fe_3O_4$ of the comparative catalyst is a major $Fe^{3+}$ reduction for the comparative catalyst.

In some embodiments, the catalyst has a first $Fe^{3+}$ reduction temperature of $Fe_2O_3$ to $Fe_3O_4$ at 470° C., a second $Fe^{3+}$ reduction temperature of $Fe_3O_4$ to Fe at 610° C., and a third $Fe^{3+}$ reduction temperature of $GdFeO_3$ to Fe at 690° C.

In some embodiments, in a temperature programmed reduction (TPR) process, a peak intensity of the third $Fe^{3+}$ reduction temperature is larger than a peak intensity of the first $Fe^{3+}$ reduction temperature, which is larger than a peak intensity of the second $Fe^{3+}$ reduction temperature.

In some embodiments, the catalyst includes 2-10 wt. % of $GdFeO_3$ and 8-16 wt. % of $Fe_2O_3$ based on the total weight of the catalyst.

In some embodiments, the catalyst includes 6.65 wt. % of $GdFeO_3$ and 12.24 wt. % of $Fe_2O_3$ based on the total weight of the catalyst.

In some embodiments, the catalyst consists of 6.65 wt. % of $GdFeO_3$, 12.24 wt. % of $Fe_2O_3$ and 81.11 wt. % of $Al_2O_3$ based on the total weight of the catalyst.

In some embodiments, the catalyst consists of 6.65 wt. % of $GdFeO_3$ in the form of the orthorhombic perovskite structure with the Pbnm space group, 12.24 wt. % of $Fe_2O_3$ in the form of $\gamma$-$Fe_2O_3$, and 81.11 wt. % of $Al_2O_3$ in the form of $\gamma$-$Al_2O_3$ based on the total weight of the catalyst.

In another exemplary embodiment, method of styrene synthesis is described. The method includes dehydrogenating ethylbenzene to form styrene in the presence of the above described catalyst using $CO_2$ as an oxidizing agent.

In some embodiments, the dehydrogenating is executed at a temperature of 600° C.

In some embodiments, the catalyst has an ethylbenzene conversion rate of 48% after 30 hours of the dehydrogenating the ethylbenzene, and the comparative catalyst has an ethylbenzene conversion rate of 38% after 30 hours of the dehydrogenating the ethylbenzene.

In some embodiments, the catalyst has a styrene selectivity of 94% after 30 hours of the dehydrogenating the ethylbenzene, and the comparative catalyst has a styrene selectivity of 78% after 30 hours of the dehydrogenating the ethylbenzene.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
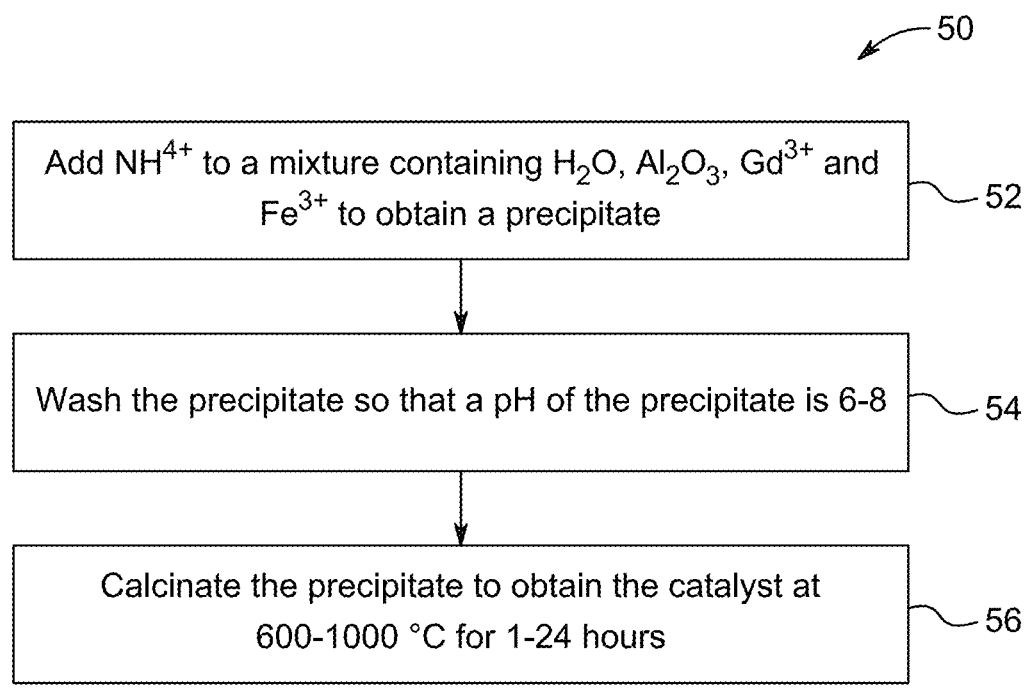
FIG. 1 is an exemplary flow chart of a method of forming a catalyst, according to certain embodiments.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'room temperature' refers to a temperature range of '25 degrees Celsius (° C.)±5° C. in the present disclosure.

As used herein, the term 'catalyst' refers to a substance that increases the rate of a chemical reaction.

As used herein, the term 'alumina support' refers to a porous form of aluminum oxide that provides a surface for dispersing catalytic materials.

As used herein, the term 'orthorhombic perovskite structure' refers to a crystal structure characterized by a distorted perovskite lattice in which the unit cell has three unequal axes intersecting at 90 degrees.

As used herein, the term 'precipitate' refers to a solid material that forms and separates from a solution during a chemical reaction.

As used herein, the term 'temperature programmed reduction (TPR)' refers to an analytical technique in which a material is exposed to a reducing gas while the temperature is increased in a controlled manner, allowing measurement of its reducibility.

As used herein, the term 'oxidizing agent' refers to a substance that accepts electrons from another species, thereby causing oxidation.

As used herein, the term 'ethylbenzene conversion rate' refers to the percentage of ethylbenzene that undergoes a chemical transformation (e.g., dehydrogenation to styrene) during a reaction, relative to the initial amount of ethylbenzene introduced.

As used herein, the term 'dehydrogenating' refers to the chemical process in which hydrogen atoms are removed from a molecule, typically in the form of a hydrogen gas. This reaction can be used to convert hydrocarbons or other compounds by removing hydrogen atoms, resulting in the formation of double bonds, rings, or other functional groups.

According to aspects of the present disclosure, incorporating perovskite structures such as $GdFeO_3$ into iron-based catalysts presents an opportunity to enhance catalyst durability by raising the $Fe^{3+}$ reduction temperature relative to $Fe_2O_3$. Techniques herein provide oxygen carriers or catalytic compositions including $GdFeO_3$ and $Fe_2O_3$ supported on alumina that may provide enhanced thermal stability, reduced catalyst deactivation, and improved ethylbenzene-to-styrene conversion performance under high-temperature chemical looping or dehydrogenation conditions utilizing $CO_2$ as a mild oxidant.

Aspects of the present disclosure are directed to a Gd-promoted iron-based catalyst supported on alumina for the dehydrogenation of ethylbenzene to styrene under high-temperature conditions. In the present disclosure, the incorporation of a gadolinium-containing perovskite structure, $GdFeO_3$, into the catalyst system is shown to enhance stability by resisting reduction to less active phases during reaction. This structural modification mitigates strong adsorption of reactants and products on reduced iron oxide sites, thereby improving catalyst longevity.

A catalyst includes an alumina support. As used herein, the term 'alumina support' refers to a porous form of aluminum oxide that provides a high surface area for dispersing active catalytic components. It can for example exist in the gamma phase, which is thermally stable and features a porous, amorphous structure. The support can appear as powders, pellets, or extrudates, and offers mechanical strength, thermal stability, and surface hydroxyl groups for anchoring metals. In some embodiments, alternative or additional supports may include, but are not limited to, silica, zeolites, carbon (activated carbon, graphene, carbon nanotubes), titanium dioxide, magnesia, zirconia, calcium carbonate, aluminum-doped zinc oxide, tin oxide, magnesium-aluminum spinels, nickel, silver, cerium oxide, polymeric supports, titanium-based supports, molybdenum oxide, ruthenium oxide or any combinations thereof.

The catalyst includes $GdFeO_3$ distributed on the alumina support. In some embodiments, gadolinium element of the catalyst exists in a single form of the $GdFeO_3$. The catalyst includes no $Gd_2O_3$. The $GdFeO_3$ is in the form of an orthorhombic perovskite structure with a Pbnm space group. Other possible structures for $GdFeO_3$, aside from the orthorhombic perovskite structure, may include rhombohedral, tetragonal, and cubic perovskite structures.

The catalyst includes $Fe_2O_3$ distributed on the alumina support. The $Fe_2O_3$ is preferably in the form of $\gamma$-$Fe_2O_3$. Other possible forms and structures of $Fe_2O_3$ include $\alpha$-$Fe_2O_3$ (Hematite), $\beta$-$Fe_2O_3$, Magnetite, FeO (Wüstite), iron oxyhydroxides (Goethite, Lepidocrocite, Akaganeite), hydrated forms, $Fe_4O_5$, high-pressure phases of $\alpha$-$Fe_2O_3$, and iron oxide clusters or nanoparticles.

The catalyst includes 1-7 wt. %, preferably 2 to 6 wt. %, preferably 2.5 to 5.5 wt. %, preferably 3 to 5 wt. %, preferably 3.5 to 4.5 wt. %, preferably 3.8 to 4.2 wt. %, preferably 4 to 4.5 wt. % of Gd and 5-15 wt. %, preferably 6 to 14 wt. %, preferably 7 to 13 wt. %, preferably 8 to 12 wt. %, preferably 9 to 11 wt. %, preferably 9.5 to 10.5 wt. %, preferably 9.8 to 10.2 wt. %, preferably 10 to 10.5 wt. %, preferably 10.1 wt. % of Fe, each based on a total weight of the catalyst. Preferably, the catalyst includes 4 wt. % of Gd and 10 wt. % of Fe based on the total weight of the catalyst.

In some embodiments, the catalyst includes 2-10 wt. %, preferably 3 to 9 wt. %, preferably 4 to 8 wt. %, preferably 5 to 7 wt. %, preferably 5.5 to 6.5 wt. %, preferably 5.8 to 6.2 wt. %, preferably 6 to 6.7 wt. %, of $GdFeO_3$, 8 to 16 wt. %, preferably 9 to 15 wt. %, preferably 10 to 14 wt. %, preferably 11 to 13 wt. %, preferably 11.5 to 12.5 wt. %, preferably 11.8 to 12.2 wt. %, preferably 12 to 12.5 wt. % of $Fe_2O_3$, and 50-90 wt. %, preferably 60-85 wt. %, preferably 70-80 wt. %, preferably 73-77 wt. %, of $Al_2O_3$ each based on the total weight of the catalyst. Preferably, the catalyst includes 6.65 wt. % of $GdFeO_3$ and 12.24 wt. % of $Fe_2O_3$ based on the total weight of the catalyst.

In some embodiments, the catalyst consists of 6.65 wt. % of $GdFeO_3$, 12.24 wt. % of $Fe_2O_3$ and 81.11 wt. % of $Al_2O_3$ based on the total weight of the catalyst. In some embodiments, the catalyst consists of 6.65 wt. % of $GdFeO_3$ in the form of the orthorhombic perovskite structure with the Pbnm space group, 12.24 wt. % of $Fe_2O_3$ in the form of γ-$Fe_2O_3$, and 81.11 wt. % of $Al_2O_3$ in the form of γ-$Al_2O_3$ based on the total weight of the catalyst.

FIG. 1 illustrates a flow chart of a method 50 of forming the catalyst. The order in which the method 50 is described is not intended to be construed as a limitation, and any number of the described method steps can be combined in any order to implement the method 50. Additionally, individual steps may be removed or skipped from the method 50 or added to the method 50 without departing from the spirit and scope of the present disclosure.

At step 52, the method 50 includes adding $NH^{4+}$ to a mixture containing $H_2O$, $Al_2O_3$, $Gd^{3+}$ and $Fe^{3+}$ to obtain a precipitate. In an embodiment, adding the $NH^{4+}$ is accomplished by adding drop by drop an aqueous solution of 28 wt. % of $NH_4OH$ based on a total weight of the aqueous solution. Methods such as a dissolution method, an injection method, a spray addition method, a slow addition method, a mixing method may also be used for adding $NH^{4+}$ to the mixture.

In an embodiment, the mixture is obtained by dissolving 0.57 grams (g) of $Gd(NO_3)_3 \cdot 6H_2O$ and 6.62 g of $Fe(NO_3)_3 \cdot 9H_2O$ in 50 milliliters (mL) of water to form a solution. Stirring, heating, ultrasonic agitation, magnetic stirring, or vortex mixing may be used for dissolving 0.57 g of $Gd(NO_3)_3 \cdot 6H_2O$ and 6.62 g of $Fe(NO_3)_3 \cdot 9H_2O$ in 50 mL of water to form the solution. In some embodiments, the water may be tap water, distilled water, bi-distilled water, deionized water, deionized distilled water, reverse osmosis water, hard water, fresh water, brine/salt water, etc. In a preferred embodiment, the water is distilled water. To the solution is added 5 g of gamma $Al_2O_3$ to form the mixture. Methods such as a dissolution method, an injection method, a spray addition method, a slow addition method, a mixing method may also be used for the addition of 5 g of gamma $Al_2O_3$ to the solution to form the mixture. In a preferred embodiment, gamma $Al_2O_3$ is added dropwise to the solution to form the mixture.

At step 54, the method 50 includes washing the precipitate so that a pH of the precipitate is 5-9, preferably 6-8, preferably 6.5-7.5, preferably about 7. The precipitate may be washed using solvents such as deionized water, ethanol, or acetone, employing techniques such as repeated rinsing, centrifugation, or filtration.

At step 56, the method 50 includes calcinating the precipitate to obtain the catalyst at 600-1000° C., preferably 650° C. to 950° C., preferably 700° C. to 900° C., preferably 750° C. to 850° C., preferably 770° C. to 830° C., preferably 780° C. to 820° C. for 1-24 hours, preferably 2 to 20 hours, preferably 3 to 16 hours, preferably 4 to 12 hours, preferably 5 to 10 hours, preferably 6 to 8 hours. In a preferred embodiment, the precipitate is calcinated at 800° C. for 6 hours under static air. The calcination is carried out by heating it to a high temperature under a predetermined amount of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably 1-40° C./min, preferably 5-30° C./min, preferably 10-20° C./min.

TGA analysis of the catalyst shows that the $Fe^{3+}$ of the catalyst is more stable than $Fe^{3+}$ of a comparative catalyst (which is the same as the catalyst except without gadolinium element) at a temperature range of 400° C. to 900° C., preferably 450° C. to 850° C., preferably 500° C. to 800° C., preferably 550° C. to 750° C., preferably 600° C. to 700° C., preferably 620° C. to 680° C., preferably 640° C. to 660° C., preferably 650° C.

In some embodiments, the first $Fe^{3+}$ reduction temperature of $Fe_2O_3$ to $Fe_3O_4$ of the catalyst is at least 20° C. (e.g. 20-60° C., preferably 25-50° C., preferably 30-45° C., preferably 35-40° C.) higher than a $Fe^{3+}$ reduction temperature of $Fe_2O_3$ to $Fe_3O_4$ of the comparative catalyst. The first $Fe^{3+}$ reduction temperature of $Fe_2O_3$ to $Fe_3O_4$ of the catalyst is a minor $Fe^{3+}$ reduction for the catalyst, whereas the $Fe^{3+}$ reduction temperature of $Fe_2O_3$ to $Fe_3O_4$ of the comparative catalyst is a major $Fe^{3+}$ reduction for the comparative catalyst.

In a specific embodiment, the catalyst has a first $Fe^{3+}$ reduction temperature of $Fe_2O_3$ to $Fe_3O_4$ at 470° C., a second $Fe^{3+}$ reduction temperature of $Fe_3O_4$ to Fe at 610° C., and a third $Fe^{3+}$ reduction temperature of $GdFeO_3$ to Fe at 690° C. In a temperature programmed reduction (TPR) process a peak intensity of the third $Fe^{3+}$ reduction temperature is larger than a peak intensity of the first $Fe^{3+}$ reduction temperature, which is larger than a peak intensity of the second $Fe^{3+}$ reduction temperature.

A method of styrene synthesis includes dehydrogenating ethylbenzene to form styrene in the presence of the catalyst using $CO_2$ as an oxidizing agent. Other methods of the styrene synthesis may include oxidative dehydrogenation of ethylbenzene using oxygen, dehydrogenation of methylstyrene, and direct dehydrogenation of ethylbenzene with air or oxygen. Other oxidizing agents used in styrene synthesis may include oxygen, air, hydrogen peroxide, chlorine, and nitric acid.

In some embodiments, the dehydrogenation is executed at a temperature of 600° C. In some embodiments, the catalyst has an ethylbenzene conversion rate of 48% after 30 hours of the dehydrogenating the ethylbenzene, whereas the comparative catalyst has an ethylbenzene conversion rate of 38% after 30 hours of the dehydrogenating the ethylbenzene. In some embodiments, the catalyst has a styrene selectivity of 94% after 30 hours of the dehydrogenating the ethylbenzene, whereas the comparative catalyst has a styrene selectivity of 78% after 30 hours of the dehydrogenating the ethylbenzene.

EXAMPLES

The following examples demonstrate a catalyst including gadolinium ferrite and iron oxide supported on alumina for ethylbenzene dehydrogenation. The examples are provided solely for illustration and are not to be construed as limitations of the present disclosure, as many variations thereof are possible without departing from the spirit and scope of the present disclosure.

Example 1: Catalyst Preparation

According to the present disclosure, $Gd(NO_3)_3 \cdot 6H_2O$ (0.57 g), and $Fe(NO_3)_3 \cdot 9H_2O$ (6.62 g) were dissolved in 50 milliliters (mL) of distilled water. To the aforesaid solution, 5 grams (g) of gamma $Al_2O_3$ was added and stirred for 15 minutes at room temperature. Further, a 28% of $NH_4OH$ solution was added drop-by-drop to obtain a precipitate, until precipitation stopped. Furthermore, the precipitate was transferred into a rotary evaporator and rotated for 4 hours at room temperature, followed by centrifugation and washing thoroughly with distilled water until the reaction mixture reached a pH of about 7. In addition, the reaction mixture was dried at 120° C. for overnight and calcined at 800° C.

for 6 hours under air. The synthesized catalyst was designated as 4% Gd/10% Fe/Al$_2$O$_3$. Herein, 4% and 10% respectively stand for weight percentages of gadolinium element and iron element based on a total weight of the synthesized catalyst (hereinafter referred to as the catalyst). A comparative catalyst of 10% Fe/Al$_2$O$_3$ was synthesized in the same way as the catalyst, except that no Gd(NO$_3$)$_3$·6H$_2$O was used. Herein, 10% stands for a weight percentage of iron element based on a total weight of the synthesized catalyst.

Example 2: Experimental Procedure

According to the present disclosure, the dehydrogenation of ethylbenzene to styrene was conducted in a tubular fixed-bed reactor operated at atmospheric pressure. 1 g of the catalyst, sieved to a particle size range corresponding to 60 to 80 mesh, was loaded into the reactor and secured using glass wool as a support matrix. The reactor was initially heated to a temperature of 600° C. under a continuous flow of nitrogen gas to establish an inert atmosphere. After reaching the target temperature, the nitrogen stream was replaced with carbon dioxide at a flow rate of 20 mL/min. Concurrently or subsequently, ethylbenzene was introduced into the reactor at a liquid feed rate of 0.022 mL/min. Further, resultant gaseous and liquid products were collected downstream in an ice-cooled trap and subsequently analysed using an Agilent 7890A gas chromatograph to determine the composition and yield of styrene and other byproducts.

Example 3: Powder X-Ray Diffraction (PXRD) Pattern

Figure 2:
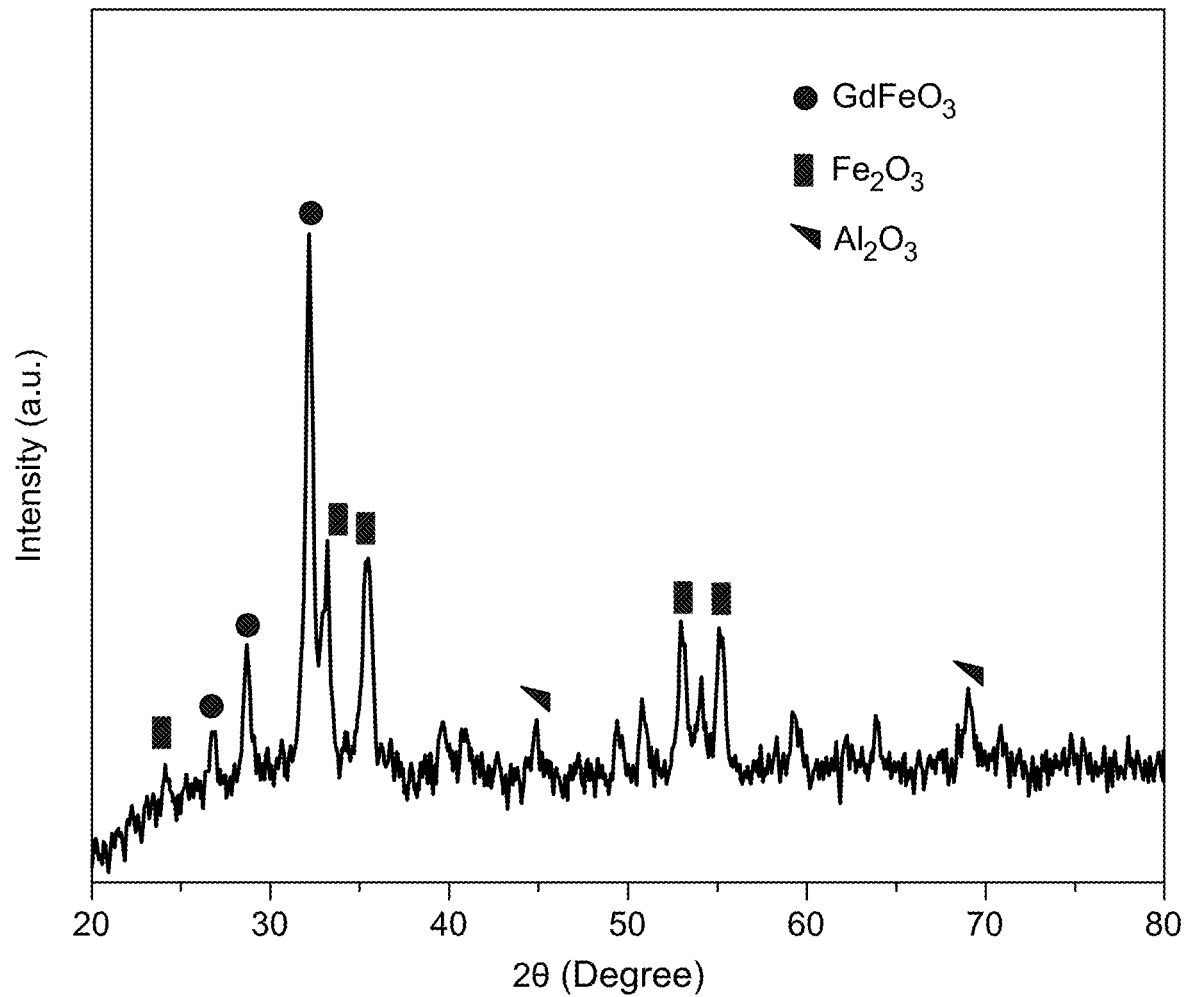
FIG. 2 illustrates a powder X-ray diffraction (XRD) pattern of a 4% Gd/10% Fe/$Al_2O_3$ catalyst, showing the crystalline phases present, according to certain embodiments.

In exemplary embodiments, crystalline phases of the synthesized catalyst were analysed using X-ray diffraction (XRD), as shown in FIG. 2. The XRD patterns indicated the presence of GdFeO$_3$, γ-Fe$_2$O$_3$, and Al$_2$O$_3$ phases within the catalyst composition. The formation of the GdFeO$_3$ phase was attributed to the co-precipitation of gadolinium (Gd) and iron (Fe) during catalyst synthesis. The diffraction peaks corresponding to GdFeO$_3$ were consistent with an orthorhombic perovskite structure belonging to the Pbnm space group and matched well with standard reference patterns as indicated by JCPDS [Y. Subramanian, V. Ramasamy, R. Karthikeyan, G. R. Srinivasan, D. Arulmozhi, R. K. Gubendiran, M. Sriramalu, Investigations on the enhanced dye degradation activity of heterogeneous BiFeO$_3$—GdFeO$_3$ nanocomposite photocatalyst, incorporated herein by reference in its entirety]. In addition to the GdFeO$_3$ phase, diffraction peaks corresponding to γ-Fe$_2$O$_3$ and Al$_2$O$_3$ were observed, confirming the coexistence of the aforesaid crystalline phases within the catalyst system.

Example 4: Temperature Programmed Reduction (TPR)

Figure 3A:
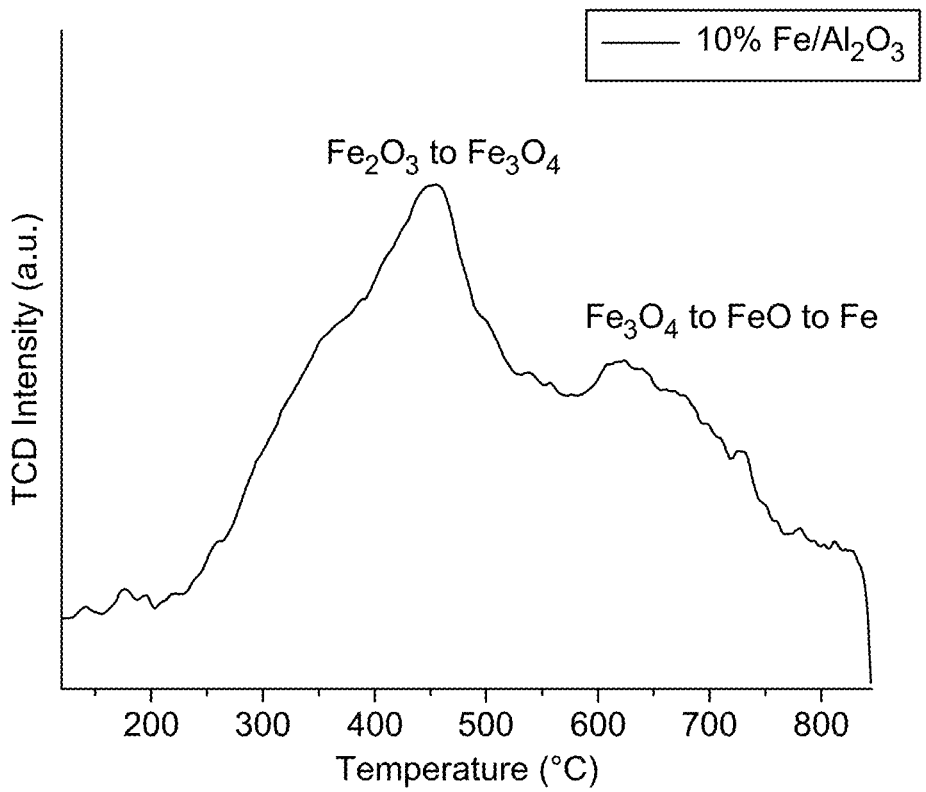
FIG. 3A illustrates a temperature-programmed reduction (TPR) profile of a 10% Fe/$Al_2O_3$ catalyst, demonstrating the reduction behavior of iron species under a hydrogen atmosphere, according to certain embodiments.
Figure 3B:
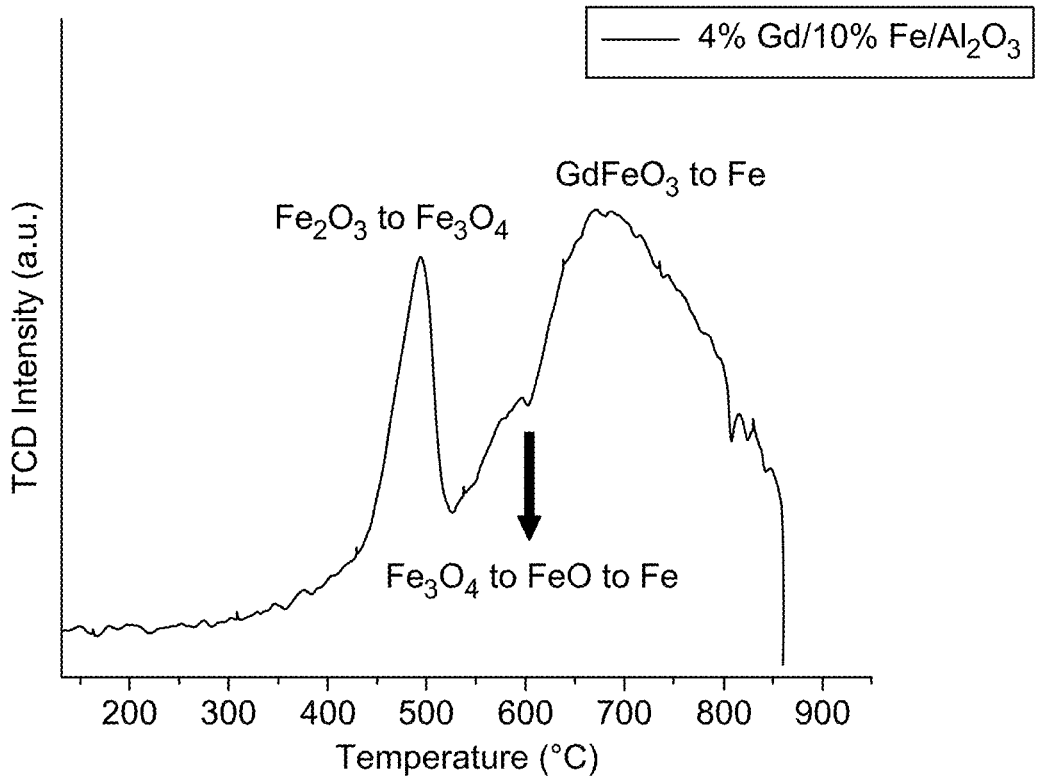
FIG. 3B illustrates a temperature-programmed reduction (TPR) profile of a 4% Gd/10% Fe/$Al_2O_3$ catalyst, indicating reduction characteristics associated with both $Fe_2O_3$ and the $GdFeO_3$ perovskite phase, according to certain embodiments.

The reduction characteristics of iron species within the catalysts were evaluated using the temperature-programmed reduction (TPR) technique. The TPR profile of the 10% Fe/Al$_2$O$_3$ catalyst exhibited two distinct reduction peaks, as shown in FIG. 3A. A first reduction peak was observed at 450° C., corresponding to the reduction of Fe$_2$O$_3$ to Fe$_3$O$_4$. A second prominent peak appeared at 620° C., attributed to the subsequent reduction of Fe$_3$O$_4$ to FeO and then to metallic Fe. In comparison, the 4% Gd/10% Fe/Al$_2$O$_3$ catalyst exhibited the formation of a GdFeO$_3$ phase in addition to Fe$_2$O$_3$, as indicated in FIG. 3B. The TPR profile of the 4% Gd/10% Fe/Al$_2$O$_3$ catalyst showed a reduction of Fe$_2$O$_3$ to Fe$_3$O$_4$ at a peak temperature of 470° C., followed by the reduction of Fe$_3$O$_4$ to Fe at approximately 610° C., and an additional reduction peak corresponding to the reduction of GdFeO$_3$ at 690° C. Further, elevated reduction temperature of Fe$^{3+}$ species within the GdFeO$_3$ perovskite structure relative to Fe$_2$O$_3$ indicated an improvement in catalyst stability. The incorporation of GdFeO$_3$ reduces the susceptibility of the catalyst to deactivation under the high-temperature dehydrogenation conditions.

Example 5: Catalytic Activity Evaluations

In some exemplary embodiments, the catalytic activity of 10% Fe/Al$_2$O$_3$ and 4% Gd/10% Fe/Al$_2$O$_3$ catalysts was evaluated for the dehydrogenation of ethylbenzene at a reaction temperature of 600° C. under atmospheric pressure, using a weight hourly space velocity (WHSV) of 1.15 h$^{-1}$. Carbon dioxide was employed as a mild oxidizing agent during the reaction.

Figure 4:
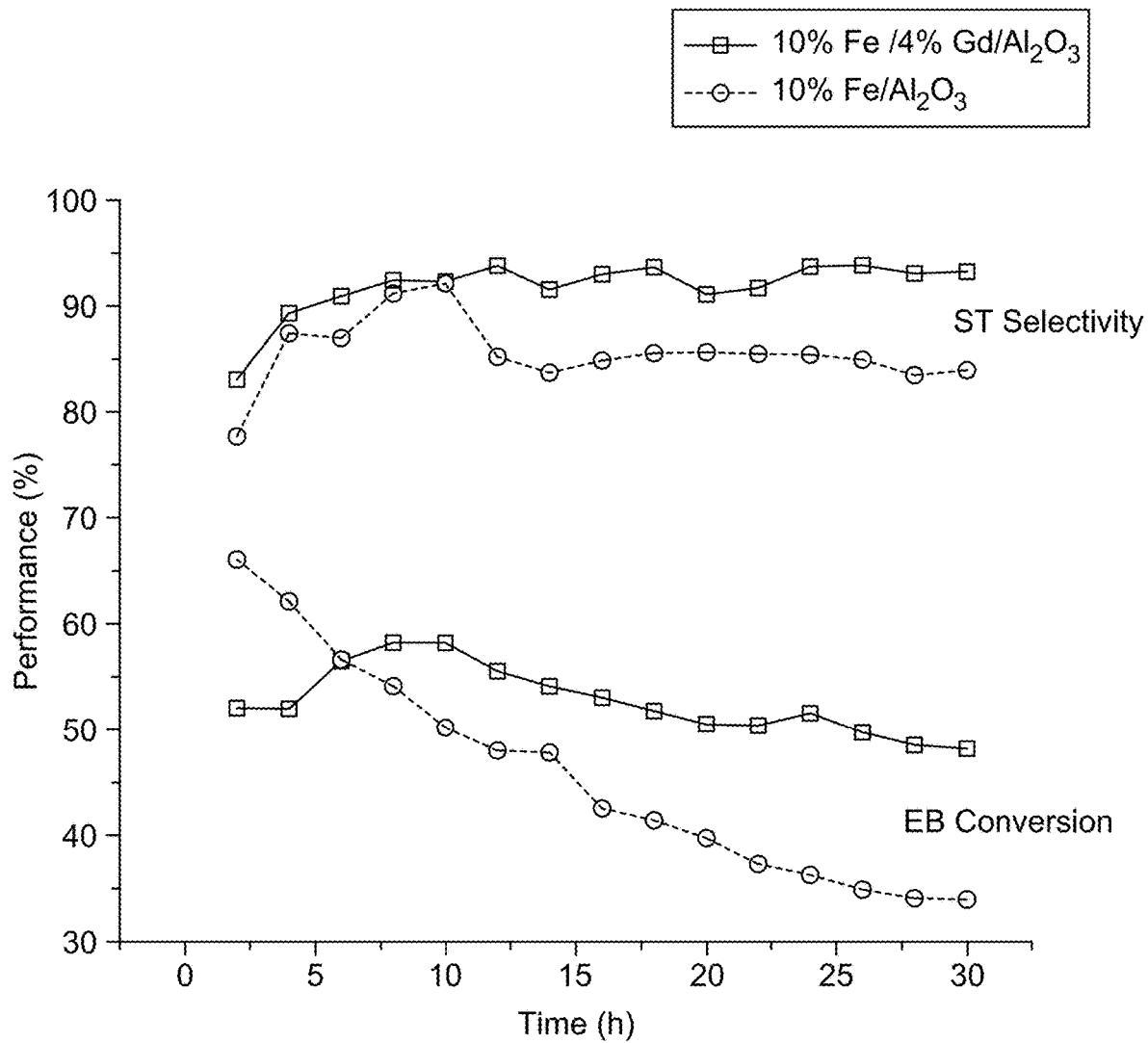
FIG. 4 illustrates a catalytic activity of ethylbenzene dehydrogenation to styrene over 10% Fe/$Al_2O_3$ and 4% Gd/10% Fe/$Al_2O_3$ catalysts, depicting conversion and selectivity profiles over a thirty-hour continuous experimental analysis, according to certain embodiments.

As shown in FIG. 4, the 10% Fe/Al$_2$O$_3$ catalyst initially exhibited an ethylbenzene conversion of 66% and a styrene selectivity of 78%. However, a decline in ethylbenzene conversion was observed over time, attributed to catalyst deactivation resulting from carbon deposition on the catalyst surface. At the operating temperature of 600° C., Fe$_2$O$_3$ undergoes reduction to Fe$_3$O$_4$ via utilization of hydrogen produced as a byproduct, leading to strong adsorption of ethylbenzene and styrene on Fe$_3$O$_4$ active sites, thereby contributing to catalyst deactivation.

The 4% Gd/10% Fe/Al$_2$O$_3$ catalyst demonstrated improved stability, achieving an ethylbenzene conversion of 48% and a styrene selectivity of 94% after thirty hours of continuous operation, as shown in FIG. 5. During a 30-hour streaming experiment, the ethylbenzene conversion for the 10% Fe/Al$_2$O$_3$ catalyst declined from 66% to 38%, whereas the ethylbenzene conversion for the 4% Gd/10% Fe/Al$_2$O$_3$ catalyst decreased slightly from 52% to 48%. The presence of the GdFeO$_3$ phase in the 4% Gd/10% Fe/Al$_2$O$_3$ catalyst contributed to improved thermal stability, with GdFeO$_3$ remaining structurally intact under reaction conditions at 600° C., in contrast to the reduction behaviour observed for Fe$_2$O$_3$. The stabling effect of GdFeO$_3$ on Fe$_2$O$_3$ at high temperature is demonstrated in FIGS. 3A and 3B.

The aspects of the present disclosure relate to catalysts including GdFeO$_3$ and Fe$_2$O$_3$ distributed on an alumina support for the dehydrogenation of ethylbenzene to styrene under high-temperature conditions. The dehydrogenation reaction of ethylbenzene to styrene is an endothermic process that typically results in catalyst deactivation over time due to the reduction of Fe$_2$O$_3$ to Fe$_3$O$_4$ at elevated temperatures, such as 600° C., with hydrogen produced as a byproduct. The formation of Fe$_3$O$_4$ leads to strong binding of ethylbenzene and styrene to the catalyst surface, promoting deactivation. In particular, a Gd-promoted Fe/Al$_2$O$_3$ catalyst was synthesized using a coprecipitation method and evaluated under reaction conditions of 600° C., atmospheric pressure, a weight hourly space velocity (WHSV) of 1.15 h$^{-1}$, and carbon dioxide as a mild oxidant. The incorporation of Gd into the catalyst composition resulted in the formation of a GdFeO$_3$ perovskite phase. The Fe species within the GdFeO$_3$ phase exhibited greater thermal stability and a higher reduction temperature compared to Fe in Fe$_2$O$_3$, contributing to improved catalyst durability during reaction. Further, comparative catalytic evaluations demonstrated that the 10% Fe/Al$_2$O$_3$ catalyst experienced a decrease in ethylbenzene conversion from 66% to 38% over thirty hours of continuous operation, whereas the 4% Gd/10% Fe/$Al_2O_3$ catalyst showed only a marginal decrease from 52% to 48% over the same time period. These results indicate that the formation of a stable $GdFeO_3$ perovskite phase mitigates the reduction of $Fe^{3+}$ at operational temperatures and significantly reduces catalyst deactivation relative to conventional $Fe_2O_3$-based systems. The catalyst synthesized herein may be utilized in ethylbenzene dehydrogenation processes for styrene production, as well as in other high-temperature hydrocarbon dehydrogenation reactions where catalyst stability and resistance to reduction-induced deactivation are critical.

Numerous modifications and variations of the present disclosure are possible in light of the above teachings. It is therefore to be understood that within the scope of the appended claims, the invention may be practiced otherwise than as specifically described herein.

The invention claimed is:

1. A catalyst, comprising:
an alumina support;
$GdFeO_3$ distributed on the alumina support; and
$Fe_2O_3$ distributed on the alumina support,
wherein the $GdFeO_3$ is in the form of an orthorhombic perovskite structure with a Pbnm space group, and the $Fe_2O_3$ is in the form of $\gamma$-$Fe_2O_3$,
wherein the catalyst comprises 1-7 wt. % of Gd and 5-15 wt. % of Fe based on a total weight of the catalyst.

2. The catalyst of claim 1, wherein the catalyst is obtained by:
adding $NH^{4+}$ to a mixture containing $H_2O$, $Al_2O_3$, $Gd^{3+}$ and $Fe^{3+}$ to obtain a precipitate;
washing the precipitate so that a pH of the precipitate is 6-8; and
calcinating the precipitate to obtain the catalyst at 600-1000° C. for 1-24 hours.

3. The catalyst of claim 2, wherein the mixture is obtained by:
dissolving 0.57 g of $Gd(NO_3)_3 \cdot 6H_2O$ and 6.62 g of $Fe(NO_3)_3 \cdot 9H_2O$ in 50 mL of water to form a solution; and
adding 5 g of gamma $Al_2O_3$ to the solution to form the mixture.

4. The catalyst of claim 2, wherein:
the precipitate is washed so that the pH of the precipitate is 7, and
the precipitate is calcinated at 800° C. for 6 hours under static air.

5. The catalyst of claim 2, wherein:
the adding the $NH^{4+}$ is accomplished by adding drop by drop an aqueous solution of 28 wt. % of $NH_4OH$ based on a total weight of the aqueous solution.

6. The catalyst of claim 1, wherein:
gadolinium element of the catalyst exists in a single form of the $GdFeO_3$, and the catalyst comprises no $Gd_2O_3$.

7. The catalyst of claim 1, wherein:
the catalyst comprises 4 wt. % of Gd and 10 wt. % of Fe based on the total weight of the catalyst.

8. The catalyst of claim 7, wherein:
$Fe^{3+}$ of the catalyst is more stable than $Fe^{3+}$ of a comparative catalyst, which is the same as the catalyst except without gadolinium element, at a temperature range of 400° C. to 900° C.

9. The catalyst of claim 8, wherein:
the first $Fe^{3+}$ reduction temperature of $Fe_2O_3$ to $Fe_3O_4$ of the catalyst is at least 20° C. higher than a $Fe^{3+}$ reduction temperature of $Fe_2O_3$ to $Fe_3O_4$ of the comparative catalyst.

10. The catalyst of claim 9, wherein:
the first $Fe^{3+}$ reduction temperature of $Fe_2O_3$ to $Fe_3O_4$ of the catalyst is a minor $Fe^{3+}$ reduction for the catalyst, and
the $Fe^{3+}$ reduction temperature of $Fe_2O_3$ to $Fe_3O_4$ of the comparative catalyst is a major $Fe^{3+}$ reduction for the comparative catalyst.

11. The catalyst of claim 8, wherein the catalyst has:
a first $Fe^{3+}$ reduction temperature of $Fe_2O_3$ to $Fe_3O_4$ at 470° C.;
a second $Fe^{3+}$ reduction temperature of $Fe_3O_4$ to Fe at 610° C.; and
a third $Fe^{3+}$ reduction temperature of $GdFeO_3$ to Fe at 690° C.

12. The catalyst of claim 11, wherein in a temperature programmed reduction (TPR) process:
a peak intensity of the third $Fe^{3+}$ reduction temperature is larger than a peak intensity of the first $Fe^{3+}$ reduction temperature, which is larger than a peak intensity of the second $Fe^{3+}$ reduction temperature.

13. The catalyst of claim 1, wherein:
the catalyst comprises 2-10 wt. % of $GdFeO_3$ and 8-16 wt. % of $Fe_2O_3$ based on the total weight of the catalyst.

14. The catalyst of claim 13, wherein:
the catalyst comprises 6.65 wt. % of $GdFeO_3$ and 12.24 wt. % of $Fe_2O_3$ based on the total weight of the catalyst.

15. The catalyst of claim 14, wherein:
the catalyst consists of 6.65 wt. % of $GdFeO_3$, 12.24 wt. % of $Fe_2O_3$ and 81.11 wt. % of $Al_2O_3$ based on the total weight of the catalyst.

16. The catalyst of claim 15, wherein the catalyst consists of:
6.65 wt. % of $GdFeO_3$ in the form of the orthorhombic perovskite structure with the Pbnm space group;
12.24 wt. % of $Fe_2O_3$ in the form of $\gamma$-$Fe_2O_3$; and
81.11 wt. % of $Al_2O_3$ in the form of $\gamma$-$Al_2O_3$ based on the total weight of the catalyst.

17. A method of styrene synthesis, comprising:
dehydrogenating ethylbenzene to form styrene in the presence of the catalyst of claim 1 using $CO_2$ as an oxidizing agent.

18. The method of claim 17, wherein:
the dehydrogenating is executed at a temperature of 600° C.

19. The method of claim 18, wherein:
the catalyst has an ethylbenzene conversion rate of 48% after 30 hours of the dehydrogenating the ethylbenzene, and
the comparative catalyst has an ethylbenzene conversion rate of 38% after 30 hours of the dehydrogenating the ethylbenzene.

20. The method of claim 18, wherein:
the catalyst has a styrene selectivity of 94% after 30 hours of the dehydrogenating the ethylbenzene, and
the comparative catalyst has a styrene selectivity of 78% after 30 hours of the dehydrogenating the ethylbenzene.

* * * * *